United States Patent [19]
Yoon

[11] Patent Number: 6,019,518
[45] Date of Patent: Feb. 1, 2000

[54] CYLINDRICAL ROLLER BEARING

[76] Inventor: Suk Tae Yoon, 337-1, Shinsa-dong, Seoul, Rep. of Korea

[21] Appl. No.: 09/050,883

[22] Filed: Mar. 31, 1998

[30]  Foreign Application Priority Data

Apr. 8, 1997 [KR]  Rep. of Korea ......................... 97-7195

[51] Int. Cl.$^7$ ..................................................... F16C 33/58
[52] U.S. Cl. ........................... 384/560; 384/508; 384/584
[58] Field of Search ..................................... 384/560, 584, 384/507, 508, 509

[56]  References Cited

U.S. PATENT DOCUMENTS 4,787,758  11/1988  Jacob ....................................... 384/508
5,433,535   7/1995  Hah .

*Primary Examiner*—Lenard A. Footland
*Attorney, Agent, or Firm*—James Creigton Wray; Meera P. Narasimhan

[57]  ABSTRACT

A cylindrical roller bearing is disclosed. Roller insertion slots are closed without forming a screw hole, but the closing of the insertion slot is firm, and the aesthetic appearance of the bearing is very perfect. Rollers 4 are inserted into operating channels 2c and 3c of inner and outer races 2 and 3 of the roller bearing 1. Insertion slots 2b and 3b are formed respectively on the collars 2a and 3a of the inner and outer races 2 and 3 to form a roller insertion hole 5 for inserting the rollers 4. The roller insertion holes 5 may be circular, rectangular, twin-arcuate or the like. After filling the rollers 4 into the operating channels 2c and 3c, a closing piece 6 is press-fitted into the insertion hole 5. The closing piece 6 may consist of two pieces 6a and 6b, and has a size larger than that of the insertion hole 5 by about 0.01 mm. Thus the closing pieces are firmly fitted into the insertion slots to such a degree that the closing pieces will never depart under any operating conditions. Further, the fastening screw or the like is not used, and therefore, the device can be applied not only to large bearings but also to small bearings. Further, a mechanically weak portion does not exist, and an aesthetically desirable roller bearing is provided.

5 Claims, 3 Drawing Sheets

CYLINDRICAL ROLLER BEARING

BACKGROUND OF THE INVENTION

1. Field of the Invention

The present invention relates to a cylindrical roller bearing.

2. Description of the Prior Art

There have been known various types of means for inserting rollers between an inner race and an outer race of a roller bearing. Among them, Korean Utility Model Publication No. 95-1724 is constituted a follows. That is, a rectangular insertion slot is formed on the collar of an inner race. Through this rectangular insertion slot, rollers are inserted to fill a space formed between the inner race and the outer race. Then a rectangular block is fitted into the rectangular insertion slot, and then, the rectangular block is fastened by means of a screw, thereby closing the insertion slot.

The above constitution of the bearing is suitable for large sized roller bearings. However, in the case of small roller bearings, the thickness of the inner race is very thin, and therefore, it is difficult to form a fastening screw hole into the inner race. Therefore the occurrences of defects are frequent, and the portion of the fastening hole becomes mechanically weak. Thus the applied field of the above described prior art becomes narrow.

SUMMARY OF THE INVENTION

The present invention is intended to overcome the above described disadvantages of the conventional technique.

Therefore it is an object of the present invention to provide a roller bearing in which roller insertion slots are closed without forming a screw hole, but the closing of the insertion slots is firm, and the aesthetic appearance of the bearing is very perfect.

In achieving the above object, the roller bearing according to the present invention is characterized as follows. That is, a roller insertion slot is formed on a side of each of the inner and outer races, and these slots are coupled to form a circular hole. Through this circular hole, rollers are inserted between the inner and outer races. Upon completion of the filling of the rollers, a closing piece which is larger than the insertion slot by about 0.01 mm is press-fitted into each of the insertion slots. Thus the closing pieces are firmly fitted into the insertion slots to such a degree that the closing pieces will never depart under any operating conditions. Further, the workability is superior because the roller inserting means is simple. Further, the fastening screw or the like is not used, and therefore, the device can be applied not only to large bearings but also to small bearings. Further, a mechanically weak portion does not exist, and an aesthetically desirable roller bearing is provided.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
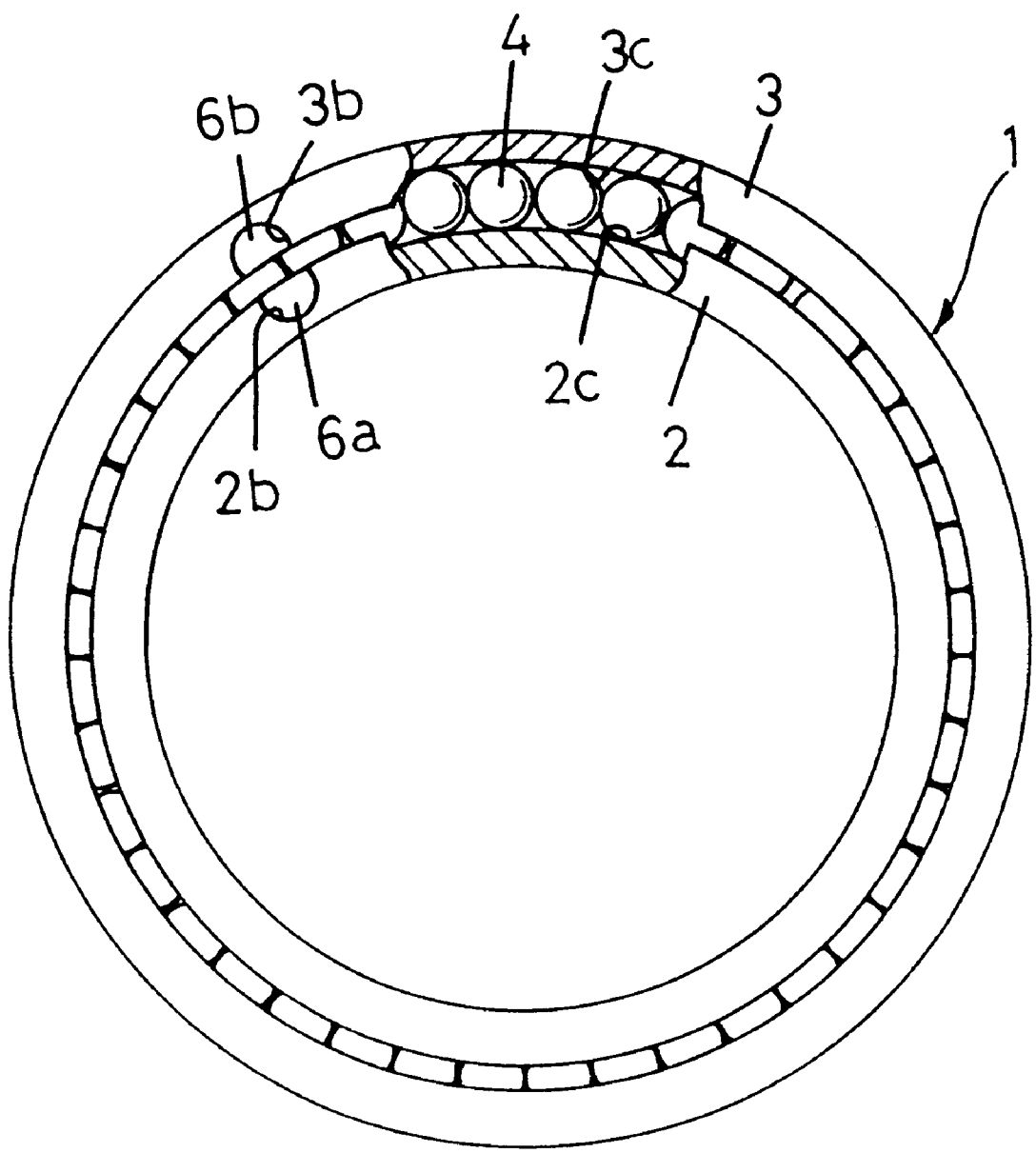
FIG. 1 is a partly cut-out side view of the roller bearing according to the present invention.
Figure 2A:
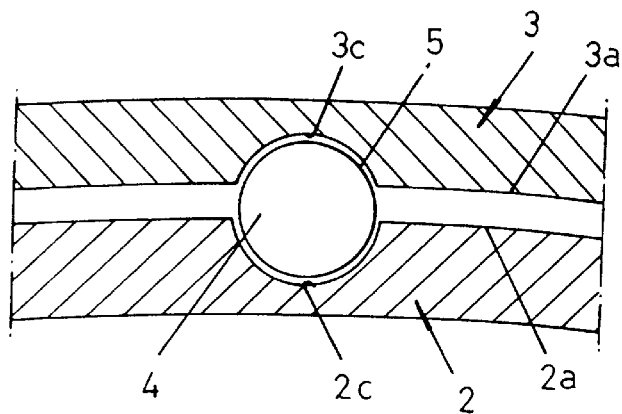
FIGS. 2A, 2B and 2C illustrate examples of the insertion slot of the present invention.
Figure 2B:
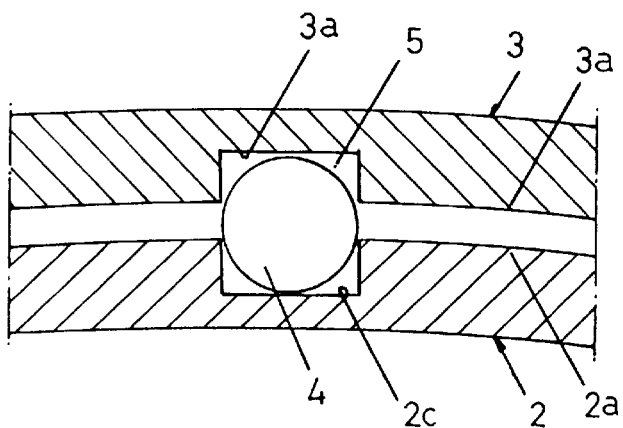
Figure 2C:
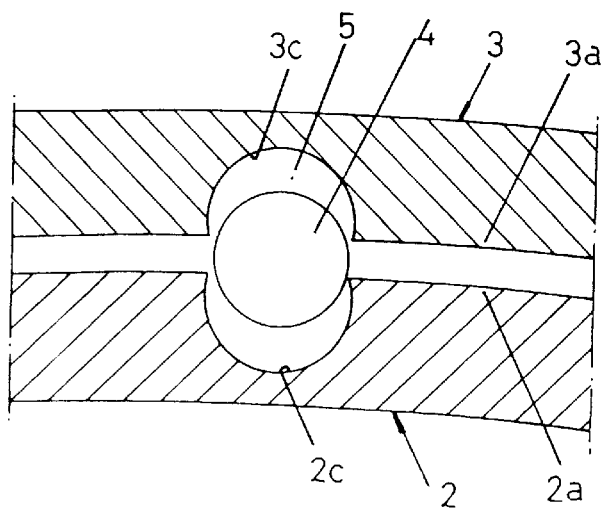
Figure 3:
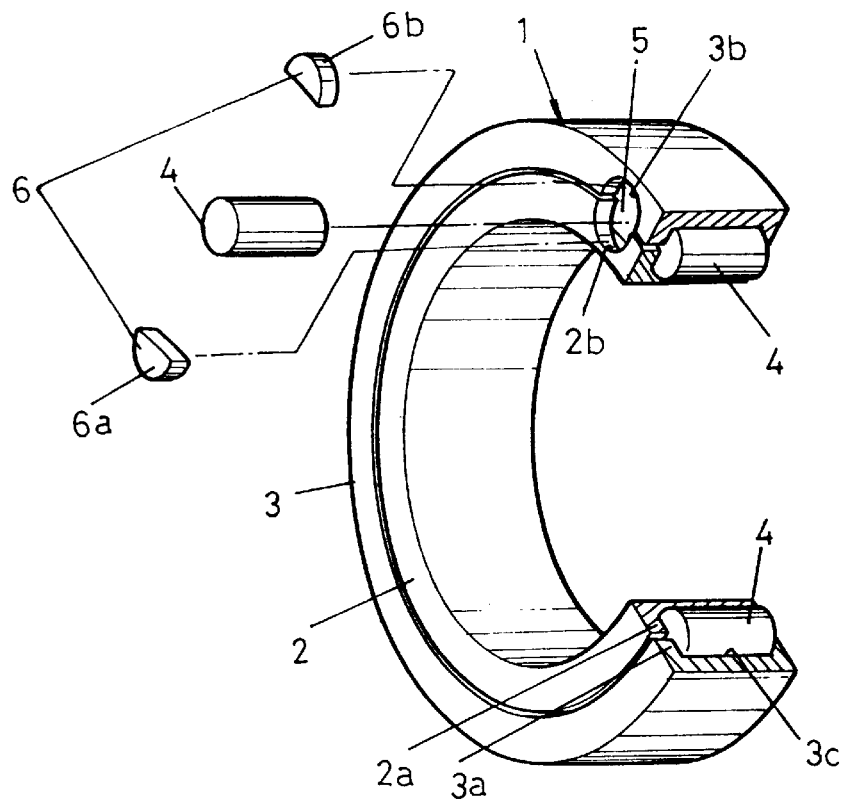
FIG. 3 is a partly cut-out exploded perspective view of the roller bearing according to the present invention.
Figure 4:
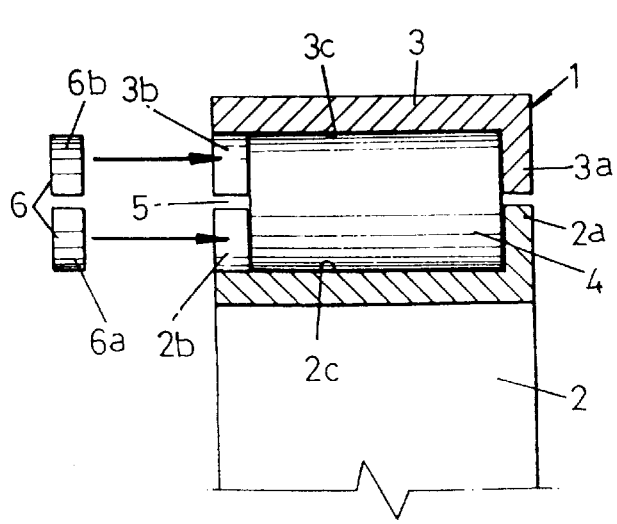
FIG. 4 is a sectional view of the critical portion of the roller bearing, showing the state before fitting the closing pieces.
Figure 5:
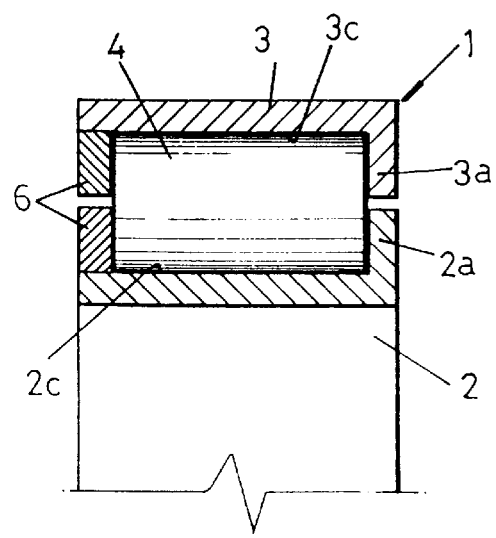
FIG. 5 is a sectional view of the critical portion of the roller bearing, showing the state after fitting the closing pieces.

Rollers 4 are inserted into operating channels 2c and 3c of inner and outer races 2 and 3 of a roller bearing 1. For this purpose, insertion slots 2b and 3b are formed respectively on the collars 2a and 3a of the inner and outer races 2 and 3 to form a roller insertion hole 5 for inserting the rollers 4. The roller insertion holes 5 may be circular, rectangular, twin-arcuate or the like as shown in FIGS. 2A, 2B and 2C. After filling the rollers 4 into the operating channels 2c and 3c, a closing piece 6 is press-fitted into the insertion hole 5. The closing piece 6 may consist of two pieces 6a and 6b, and has a size larger than that of the insertion hole 5 by about 0.01 mm.

In the device of the present invention constituted as described above, the assembling procedure is as follows. That is, the rollers 4 are inserted through the insertion hole 5 which consists of the insertion slots 2b and 3b which are formed on the collars 2a and 3a of the inner and outer races 2 and 3 of the roller bearing 1. Thus the operating channels 2c and 3c of the inner and outer races 2 and 3 are filled with the rollers 4. The size of the insertion hole 5 is slightly larger than that of the roller 4, and therefore, the rollers 4 can be easily inserted. After insertion of all the rollers, the closing pieces 6a and 6b are press-fitted into the insertion slots 2b and 3b of the inner and outer races 2 and 3. Under this condition, the size of the closing pieces 6a and 6b of the closing piece 6 is larger than that of the insertion slots 2b and 3b by about 0.01 mm, and therefore, the closing pieces 6a and 6b are firmly fitted. Therefore, when the bearing revolves with a load imposed, the centrifugal force cannot make the closing pieces 6a and 6b depart from the insertion slots 2b and 3b even without using a fastening screw. As a matter of fact, the rollers 4 smoothly actuate within the operating channels 2c and 3c, because they are not biased sideward.

According to the roller bearing of the present invention, a roller insertion slot is formed on a side of each of the inner and outer races, and these slots are coupled to form a circular hole. Through this circular hole, rollers are inserted between the inner and outer races. Upon completion of the filling of the rollers, a closing piece which is larger than the insertion slot by about 0.01 mm is press-fitted into each of the insertion slots. Thus the closing pieces are firmly fitted into the insertion slots to such a degree that the closing pieces will never depart under any operating conditions. Further, the workability is superior because the roller inserting means is simple. Further, the fastening screw or the like is not used, and therefore, the device can be applied not only to large bearings but also to small bearings. Further, a mechanically weak portion does not exist, and an aesthetically desirable roller bearing is provided.

What is claimed is:

1. A cylindrical roller bearing comprising collars of inner and outer races, insertion slots formed on the races, an insertion hole formed by the insertion slots, closing pieces for sealing the insertion hole, the closing pieces having a diameter greater than a diameter of the insertion slots.

2. The roller bearing of claim 1, wherein the insertion slots have a shape selected from a group consisting of rectangular, circular and twin-arcuate shapes.

3. The roller bearing of claim 1, wherein the closing pieces are removable positioned in the insertion slots.

4. The roller bearing of claim 1, wherein the diameter of the closing pieces is 0.01 mm greater than the diameter of the insertion slots.

5. The roller bearing of claim 1, wherein the closing pieces are press-fitting pieces.

* * * * *